Figure 1:
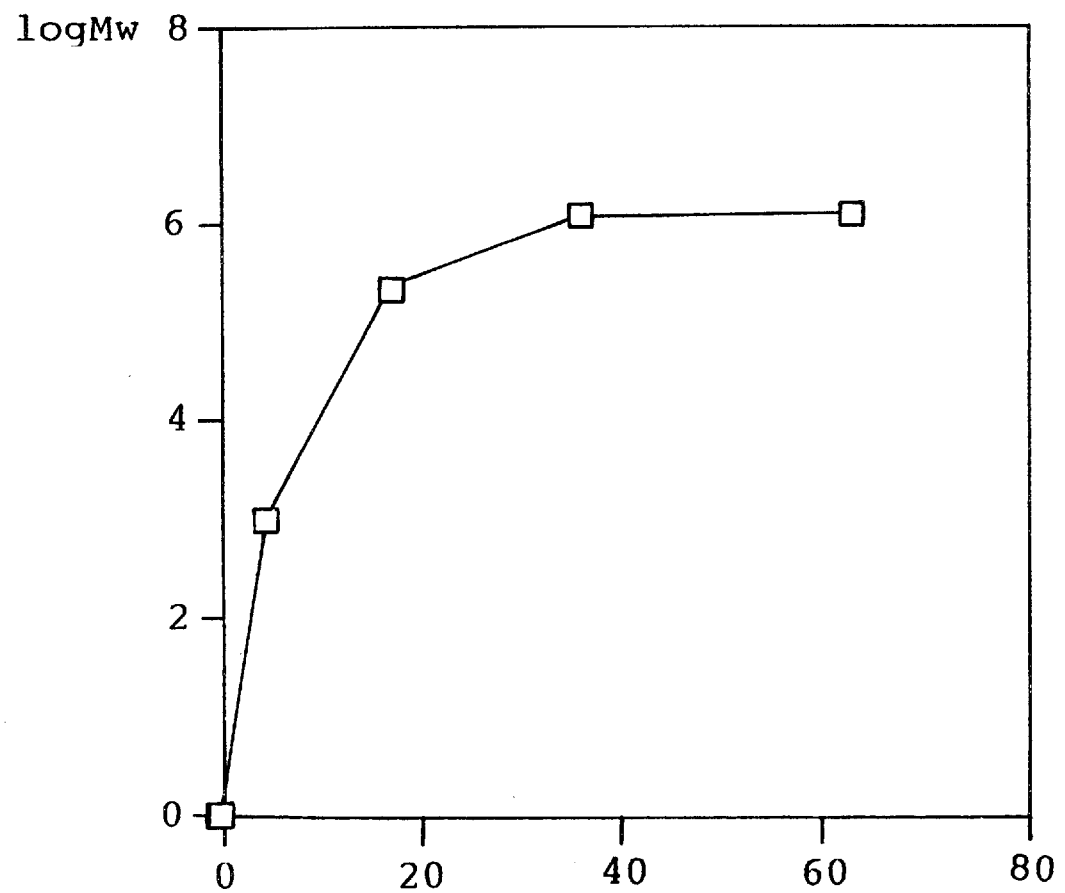

United States Patent
Andrianov et al.

[11] Patent Number: 5,869,016
[45] Date of Patent: Feb. 9, 1999

[54] PRODUCTION OF POLYORGANOPHOSPHAZENES HAVING DESIRED MOLECULAR WEIGHTS

[75] Inventors: Alexander K. Andrianov, Belmont; Mark P. LeGolvan, West Roxbury; Yuri Svirkin, Belmont; Sameer S. Sule, Marlboro, all of Mass.

[73] Assignee: Virus Research Institute, Inc., Cambridge, Mass.

[21] Appl. No.: 877,823

[22] Filed: Jun. 18, 1997

[51] Int. Cl.$^6$ ..................................... C01B 25/10
[52] U.S. Cl. ........................ 423/300; 423/265; 528/168
[58] Field of Search ..................... 423/265, 300; 528/168

[56] References Cited

U.S. PATENT DOCUMENTS

| | | | |
|---|---|---|---|
| 3,917,802 | 11/1975 | Allcock et al. | 423/300 |
| 4,889,910 | 12/1989 | Bordere et al. | 528/168 |
| 5,098,574 | 3/1992 | Chambrette et al. | 528/168 |
| 5,230,875 | 7/1993 | de Jaeger et al. | 423/300 |
| 5,707,597 | 1/1998 | Andrianov et al. | 524/372 |

OTHER PUBLICATIONS

Allcock, et al., *Macromolecules*, vol. 3, No. 1, pp. 36–42 (Jan.–Feb. 1975).
Andrianov, et al., *J. of Applied Polymer Science*, vol. 60, pp. 2289–2295 (1996).
Allcock, *Advances in Chemistry*, No. 248, pp. 3–29 (1996).

*Primary Examiner*—Terressa Mosley
*Attorney, Agent, or Firm*—Elliot M. Olstein; Raymond J. Lillie

[57] ABSTRACT

A method for producing a polyorganophosphazene, such as, for example, poly[di(carboxylatophenoxy)phosphazenel], from polydichlorophosphazene. The polydichlorophosphazene is reacted with at least one nucleophilic reagent at a defined molar ratio of the at least one nucleophilic reagent to the polydichlorophosphazene. Such process results in the production of a polyorganophosphazene having a molecular weight within a desired range.

10 Claims, 1 Drawing Sheet

Propyl paraben/polydichlorophosphazene, mol/mol

PRODUCTION OF POLYORGANOPHOSPHAZENES HAVING DESIRED MOLECULAR WEIGHTS

This invention relates to the production of polyorganophosphazenes from polydichlorophosphazene. More particularly, this invention relates to the production of polyorganophosphazenes having desired molecular weights by reacting polydichlorophosphazene with at least one nucleophilic reagent at specified molar ratios of the at least one nucleophilic reagent to the polydichlorophosphazene.

Polyorganophosphazenes are polymers with backbones consisting of alternating phosphorus and nitrogen atoms, separated by alternating single and double bonds (—N=P—). Each phosphorus atom is bonded covalently to two organic side groups such as, for example, alkoxy, aryloxy, or alkylamino. The versatility of side groups provides such polyorganophosphazenes with a range of properties which make polyorganophosphazenes useful in a variety of applications, including flame-retardant and conductive materials, elastomers, and biomaterials. (Allcock, *Inorganic Polymers*, Mark, et al., eds, Prentice Hall, New Jersey, pgs. 61–139 (1992)).

Water soluble polyphosphazenes and their hydrogels are useful as biomaterials, membranes, and controlled release and drug delivery systems. Poly[di(carboxylatophenoxy)-phosphazene], or PCPP, is a powerful immunoadjuvant and an excellent material for microencapsulation as described in U.S. Pat. Nos. 5,494,673, issued to Andrianov, et al., and 5,529,777, issued to Andrianov, et al. The molecular weight of a PCPP polymer can have a direct impact upon its biological activity. Therefore, it is important to obtain PCPP polymers having molecular weights at which the biological activity of the PCPP polymer is optimized.

Polyorganophosphazenes may be produced by macromolecular substitution of polydichlorophosphazene with nucleophilic reagents. This method allows the extensive manipulation of the molecular structure and physicochemical properties of polyorganophosphazenes. The molecular weight of the polyorganophosphazene, however, is determined by the molecular weight of polydichlorophosphazene, which is unstable and difficult to handle. Because there is very limited or no control over molecular weight during the synthesis of polydichlorophosphazene, methods of post-synthetic treatment of polydichlorophosphazene with different reagents were devised. Such methods, however, are complex and require the use of corrosive reactants. For example, U.S. Pat. No. 3,917,802, issued to Allcock, et al., describes the use of phosphorus pentachloride to cleave the backbone of polydichlorophosphazene. U.S. Pat. No. 4,225,567, issued to de Jaeger, discloses controlling the molecular weight of polydichlorophosphazene by heating polydichlorophosphazene in the presence of phosphorus oxychloride. No methods, however, have been described that allow one to regulate the molecular weight of polyphosphazenes during the macromolecular substitution reaction.

It is an object of the present invention to provide a method of producing polyorganophosphazenes having desired molecular weights without the need for additional treatment of polydichlorophosphazene.

In accordance with an aspect of the present invention, there is provided a method for producing a polyorganophosphazene having a molecular weight of at least 1,000. The method comprises reacting polydichlorophosphazene and at least one nucleophilic reagent at a molar ratio of the at least one nucleophilic reagent to the polydichlorophosphazene of from about 2:1 to about 70:1, to produce a substituted polyorganophosphazene. Water then is added to the substituted polyorganophosphazene to produce the polyorganophosphazene having a molecular weight of at least 1,000. In one embodiment, the polyorganophosphazene has a molecular weight of from 1,000 to about 1,200,000.

In another embodiment, the polydichlorophosphazene and the at least one nucleophilic reagent are reacted in the presence of an organic solvent. Organic solvents which may be employed include, but are not limited to, tetrahydrofuran, dioxane, toluene, benzene, and diglyme. In one embodiment, the organic solvent is diglyme.

Polyorganophosphazenes which may be produced in accordance with the present invention include, but are not limited to, water-soluble polyorganophosphazenes. In general, water-soluble polyorganophosphazenes are polyorganophosphazenes containing hydrophilic side groups and forming homogenous solutions when dispersed in water or aqueous solutions of acids, bases, and/or salts. Examples of water-soluble polyorganophosphazenes include, but are not limited to, poly[bis(methylamino)phosphazene], poly[bis-(methoxyethoxyethoxy) phosphazene], and polyorganophosphazenes with glucosyl and glyceryl side groups, and copolymers thereof. Examples of such water-soluble polyorganophosphazenes are described in Allcock, *Hydrophilic Polymers: Performance with Environmental Acceptance*, Glass, ed., American Chemical Society, Adv. Chem. Series, pgs. 3–29 (1996).

Other examples of polyorganophosphazenes include water-soluble polyphosphazene polyelectrolytes. Polyphosphazene polyelectrolytes are polyphosphazenes that contain ionized or ionizable side groups that render the polyphosphazene anionic, cationic, or amphiphilic. The ionic groups may be in the form of an acid, base, or salt that is or can be dissociated at least partially. Any ion can be used as a counterion of the salt. Such ions include, but are not limited to, sodium, potassium, ammonium, chloride, and bromide. The water-soluble polyphosphazene polyelectrolytes also may contain non-ionic side groups.

In a preferred embodiment, the water-soluble polyorganophosphazene is a polyanion and contains side groups that include carboxylic acid or sulfonic acid. In a most preferred embodiment, the water-soluble polyorganophosphazene is poly[di(carboxylatophenoxy)phosphazene], or PCPP.

In general, water-soluble polyorganophosphazenes, including PCPP, can be prepared by a macromolecular nucleophilic substitution reaction of polydichlorophosphazene with a wide range of chemical reagents or mixtures of reagents in accordance with methods known to those skilled in the art. In one embodiment, the water-soluble polyorganophosphazene is made by reacting polydichlorophosphazene with a Group I metal alkoxide or a Group I metal aryloxide, preferably a sodium alkoxide or sodium aryloxide. Examples of such nucleophilic reagents include, but are not limited to, propyl p-hydroxybenzoate (propyl paraben), sodium propyl p-hydroxybenzoate (sodium propyl paraben), sodium ethyl hydroxybenzoate, sodium ethyl salicylate, sodium 2-methoxy ethanolate, and sodium methoxyethoxy ethanolate, and mixtures thereof.

In a preferred embodiment, the at least one nucleophilic reagent includes a mixture of propyl p-hydroxybenzoate (propyl paraben) and sodium propyl p-hydroxybenzoate (sodium propyl paraben). Preferably, the polydichlorophosphazene is reacted with the mixture of propyl p-hydroxybenzoate and sodium propyl p-hydroxybenzoate at a molar ratio of the mixture of propyl p-hydroxybenzoate and sodium propyl p-hydroxybenzoate to polydichlorophosphazene of from about 2:1 to about 70:1, preferably from about 51:1 to about 35:1. In another embodiment, the propyl p-hydroxybenzoate and sodium propyl p-hydroxybenzoate are present in the mixture at a molar ratio of about 1:1.

Water may be added to the substituted polyorganophosphazene upon completion of the substitution reaction. Alternatively, the substituted water-soluble polyphosphazene may be dissolved in water or in aqueous solutions, acids, bases, or salts, or in mixtures of water with organic solvents. In one embodiment, the substituted polyorganophosphazene is reacted with a base, in the presence of water, to produce a polyphosphazene polyacid or acid salt. When polydichlorophosphazene is reacted with propyl paraben and sodium propyl paraben to produce a substituted polyorganophosphazene, after the production of the substituted polyorganophosphazene, the ester function of the propyl paraben substituted polyphosphazene is hydrolyzed with base to produce poly[di(carboxylatophenoxy)phosphazene], or PCPP. It is during this step that water may be added. dr The invention now will be described with respect to the drawing, wherein:

FIG. 1 is a graph of the log of the molecular weight of PCPP prepared at different molar ratios of propyl paraben and sodium propyl paraben mixture to polydicholorphosphazene.

The invention now will be described with respect to the following examples, however, the scope of the present invention is not intended to be limited thereby.

EXAMPLES 1–4

A mixture of sodium propyl paraben and propyl paraben (molar ratio 1:1) was prepared in the presence of 210 ml of diglyme in the amounts shown in Table I below. This mixture was added to a reaction flask charged with 130 g of polydichlorophosphazene solution in diglyme (0.2M) under nitrogen. The reaction mixture was refluxed for 8 hours. After cooling to 95° C., 16N potassium hydroxide solution was added dropwise to the reaction flask in the amounts shown in Table I below. 5 to 20 ml of water then was added to the reaction mixtures. The PCPP precipitate was allowed to settle, and the organic solvent containing solution was decanted.

The PCPP was dissolved in 1 liter of deionized water, and then precipitated with 500 ml of 15% aqueous sodium chloride solution or hydrochloric acid (for lower molecular weight samples as shown in Table I, entries 1 and 2). After the water was decanted, the PCPP was redissolved in 150 ml deionized water and then precipitated with 150 ml ethanol.

Weight average molecular weights were measured by gel permeation chromatography (GPC) with a multi-angle laser light-scattering detector in phosphate buffered solution as described in Andrianov, et al., *J. App. Pol. Sci.*, Vol. 60, pgs. 2289–2295 (1996). Polydichlorophosphazene concentrations were measured by $^{31}P$ NMR spectrometry (Brucker AM360 spectrometer with Oxford magnet). The results are shown in FIG. 1 and in Table I below.

TABLE I

| Example | Propyl paraben* (mole) | Propyl paraben*/polydichlorophosphazene (mole/mole) | KOH (mole) | Mw (g/mole × $10^{-3}$) |
| --- | --- | --- | --- | --- |
| 1 | 0.099 | 3.7 | 0.19 | 1** |
| 2 | 0.430 | 16.2 | 0.8 | 230 |
| 3 | 0.950 | 35.6 | 1.79 | 1,200 |
| 4 | 1.13 | 62.4 | 2.23 | 1,200 |

*Propyl paraben was calculated as the sum of moles of sodium propyl paraben and moles of propyl paraben.
**Determined by GPC using UV detection and PCPP narrow standard It is to be understood, however, that the scope of the present invention is not to be limited to the specific embodiments described above. The invention may be practiced other than as particularly described and still be within the scope of the accompanying claims.

What is claimed is:

1. A method for producing a polyorganophosphazene having a weight average molecular weight of at least 1,000 comprising:

(a) reacting polydichlorophosphazene and at least one nucleophilic reagent, at a molar ratio of said at least one nucleophilic reagent to said polydichlorophosphazene of from about 2:1 to about 70: 1, to produce a substituted polyorganophosphazene; and (b) adding water to said substituted polyorganophosphazene to produce said polyorganophosphazene having a weight average molecular weight of at least 1,000.

2. The method of claim 1 wherein said polyorganophosphazene has a weight average molecular weight of from 1,000 to about 1,200,000.

3. The method of claim 1 wherein said polydichlorophosphazene and said at least one nucleophilic reagent are reacted in the presence of an organic solvent.

4. The method of claim 3 wherein said organic solvent is diglyme.

5. The method of claim 1 wherein said polyorganophosphazene is a water soluble polyorganophosphazene.

6. The method of claim 5 wherein said polyorganophosphazene is a polyphosphazene polyelectrolyte.

7. The method of claim 6 wherein said polyorganophosphazene is poly[di(carboxylatophenoxy)phosphazene].

8. The method of claim 1 wherein said at least one nucleophilic reagent includes a mixture of propyl p-hydroxybenzoate and sodium propyl p-hydroxybenzoate.

9. The method of claim 8 wherein said polydichlorophosphazene is reacted with said mixture of propyl p-hydroxybenzoate and sodium propyl p-hydroxybenzoate at a molar ratio of said mixture of propyl p-hydroxybenzoate and sodium propyl p-hydroxybenzoate to polydichlorophosphazene of from about 5:1 to about 35:1.

10. The method of claim 8 wherein said propyl p-hydroxybenzoate and said sodium propyl p-hydroxybenzoate are present at a molar ratio of said propyl p-hydroxybenzoate to said sodium propyl p-hydroxybenzoate of about 1:1.

* * * * *